(12) United States Patent
Liu

(10) Patent No.: US 6,394,479 B1
(45) Date of Patent: May 28, 2002

(54) FOLDABLE FRAME FOR A BICYCLE

(75) Inventor: Shao-Chieh Liu, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 09/634,266

(22) Filed: Aug. 8, 2000

(51) Int. Cl.[7] .............................................. B62K 15/00
(52) U.S. Cl. ......................... 280/287; 280/278; 16/324
(58) Field of Search ................................ 280/287, 278; 292/113; 16/324, 321

(56) References Cited

U.S. PATENT DOCUMENTS

| | | | |
|---|---|---|---|
| 578,011 A | * 3/1897 | Girardet | |
| 3,979,136 A | * 9/1976 | Lassiere | 280/278 |
| 4,440,414 A | * 4/1984 | Wang | 280/287 |
| 4,462,606 A | * 7/1984 | Hon | 280/278 |
| 4,842,292 A | * 6/1989 | Wang | 280/287 |
| 5,269,550 A | * 12/1993 | Hon et al. | 280/278 |
| 5,337,609 A | * 8/1994 | Hsu | 74/551.3 |
| 5,398,955 A | * 3/1995 | Yeh | 280/287 |

* cited by examiner

Primary Examiner—Anne Marie Boehler
Assistant Examiner—Tony Winner
(74) Attorney, Agent, or Firm—Christie, Parker & Hale, LLP

(57) ABSTRACT

A frame for a bicycle includes first and second frame halves disposed one behind another. A pivot member interconnects pivotally connecting end portions of the first and second frame halves to permit relative rotation between the first and second frame halves. A locking device locks the first and second frame halves on each other, thereby preventing relative rotation therebetween. The connecting end portion of the first frame half has a vertical end surface that is perpendicular to a longitudinal direction of the bicycle, an integral upper lateral projection, and an integral lower lateral projection that is located under the upper lateral projection to define a recess therebetween. The connecting end portion of the second frame half has a vertical end surface which is perpendicular to the longitudinal direction and which abuts against the vertical end surface of the first frame half so as to prevent relative movement between the first and second frame halves in the longitudinal direction. The end surface of the second frame half is formed with an integral tongue which engages the recess in the first frame half to prevent relative vertical movement between the first and second frame halves.

1 Claim, 5 Drawing Sheets

FOLDABLE FRAME FOR A BICYCLE

BACKGROUND OF THE INVENTION

1. Field of Invention

The invention relates to a frame for a bicycle, more particularly to a foldable frame for a bicycle.

2. Description of the Related Art

Referring to FIG. 1, a conventional foldable frame 1 for a bicycle is shown to include first and second frame halves 2,8 with connecting end portions 4,5, and a hinge member that has two knuckles connected securely to the connecting end portions 4,5 of the first and second frame halves 2,8, and a pivot shaft 6 extending through the knuckles so as to interconnect pivotally the connecting end portions 4, 5 of the first and second frame halves 2,8 to permit rotation of the first and second frame halves 2,8 relative to each other to a folded position. A locking device is provided to retain the first and second frame halves 2,8 in an unfolded position, thereby preventing relative rotation between the first and second frame halves 2,8.

The connecting end portions 4,5 of the first and second frame halves 2,8 are in the form of complementary stepped sections 401,501. The locking device includes a locking bolt 7 threadedly inserted through the stepped sections 401,501. However, frequent riding on an uneven road surface will result in a vibration force that forces apart the stepped sections 401,501, which in turn will pull the knuckles away from each other in the axial direction of the pivot shaft 6 such that loosening of the hinge member between the first and second frame halves 2,8 may occur.

SUMMARY OF THE INVENTION

The main object of this invention is to provide a foldable frame for a bicycle which is clear of the aforesaid disadvantages that are generally associated with the conventional foldable frame.

Accordingly, a foldable frame for a bicycle of the present invention includes a first frame half with a connecting end portion, a second frame half with a connecting end portion, a vertical pivot member, and a locking device. The first and second frame halves are arranged one behind another. The pivot member interconnects pivotally the connecting end portions of the first and second frame halves to permit rotation of the first and second frame halves relative to each other to a folded position. The locking device locks the first and second frame halves on each other, thereby preventing relative rotation between the first and second frame halves. The connecting end portion of the first frame half has a vertical end surface that is perpendicular to a longitudinal direction of the bicycle, an integral upper lateral projection, and an integral lower lateral projection that is located under the upper lateral projection to define a recess therebetween. The upper lateral projection has a horizontal bottom surface. The lower lateral projection has a horizontal top surface. The connecting end portion of the second frame half has a vertical end surface which is perpendicular to the longitudinal direction of the bicycle and which abuts against the vertical end surface of the first frame half so as to prevent relative movement between the first and second frame halves in the longitudinal direction. The vertical end surface of the second frame half is formed with an integral tongue which engages the recess in the first frame half, and which has a horizontal top surface that abuts against the bottom surface of the upper lateral projection of the first frame half, and a horizontal bottom surface that abuts against the top surface of the lower lateral projection of the first frame half so as to prevent relative vertical movement between the first and second frame halves.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
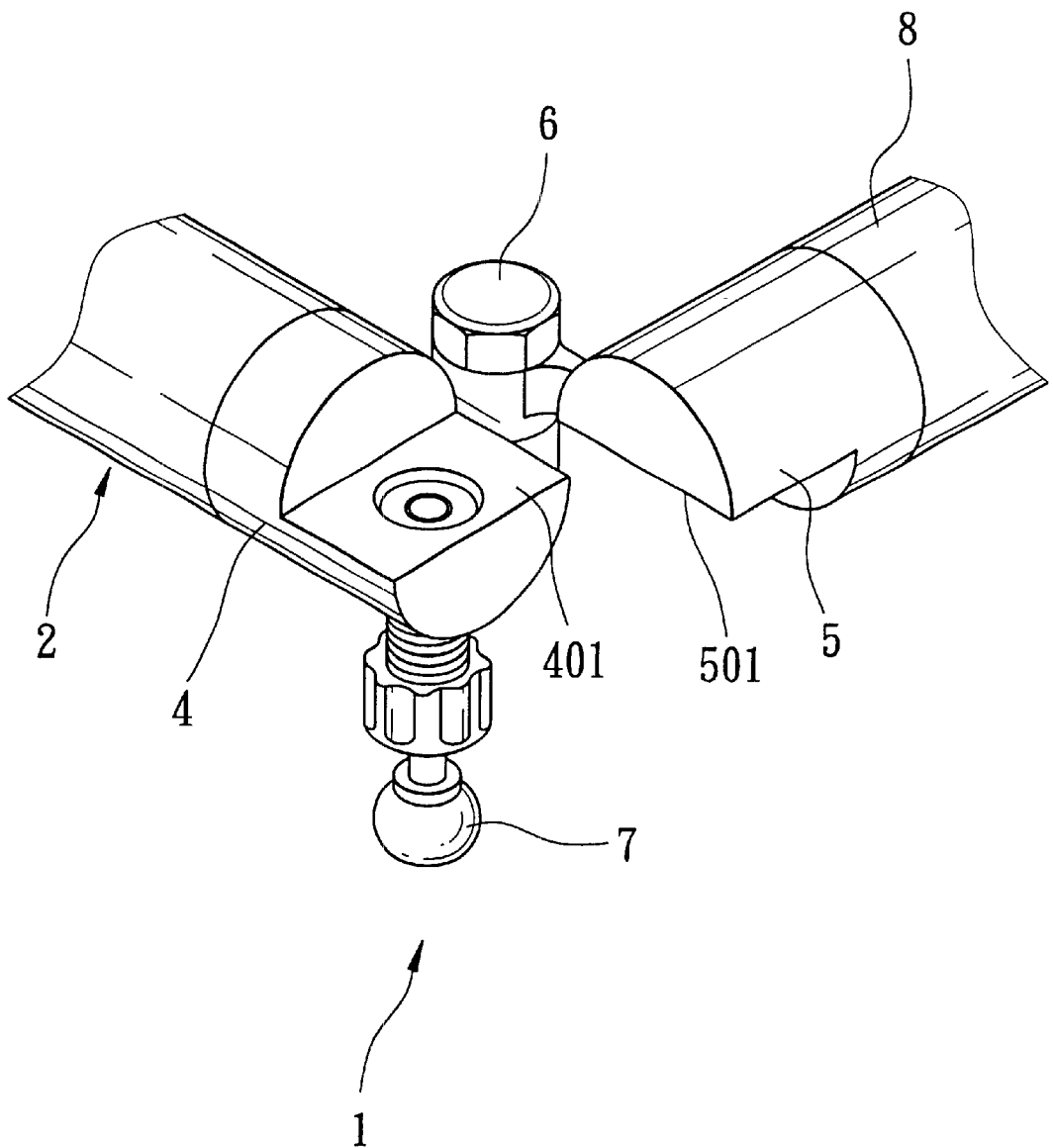
FIG. 1 is a fragmentary perspective view of a conventional foldable frame for a bicycle.
Figure 2:
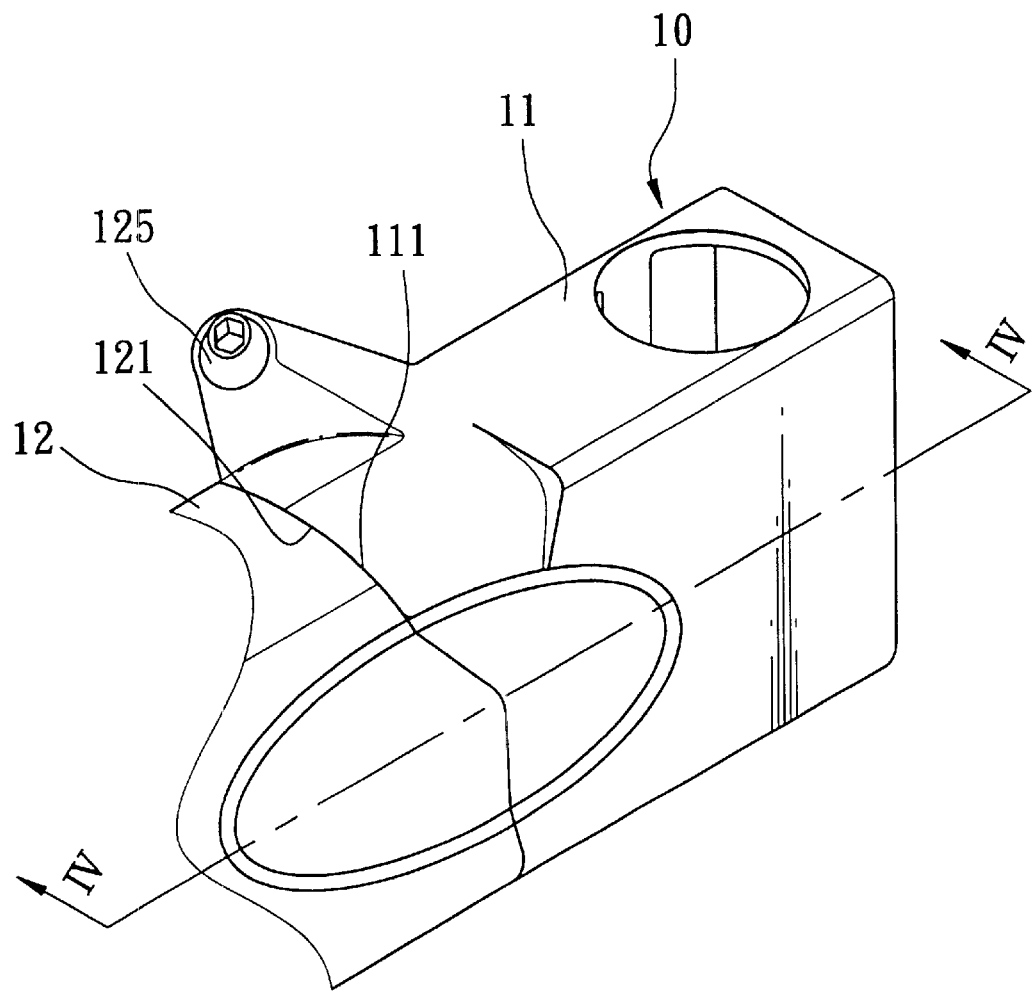
FIG. 2 is a fragmentary perspective view of the preferred embodiment of a foldable frame for a bicycle according to the present invention.
Figure 3:
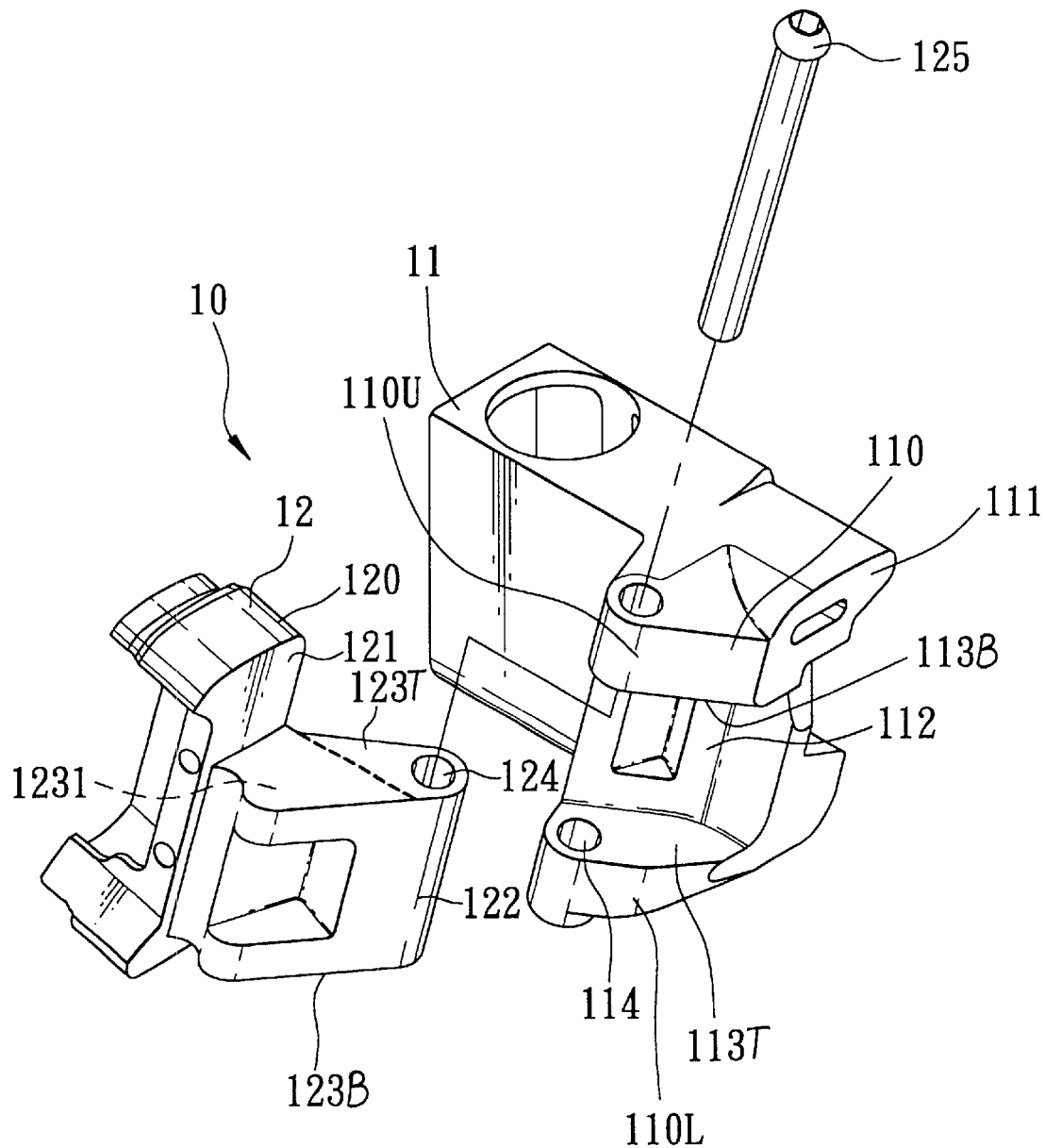
FIG. 3 is a fragmentary exploded view of the preferred embodiment shown in FIG. 2.
Figure 4:
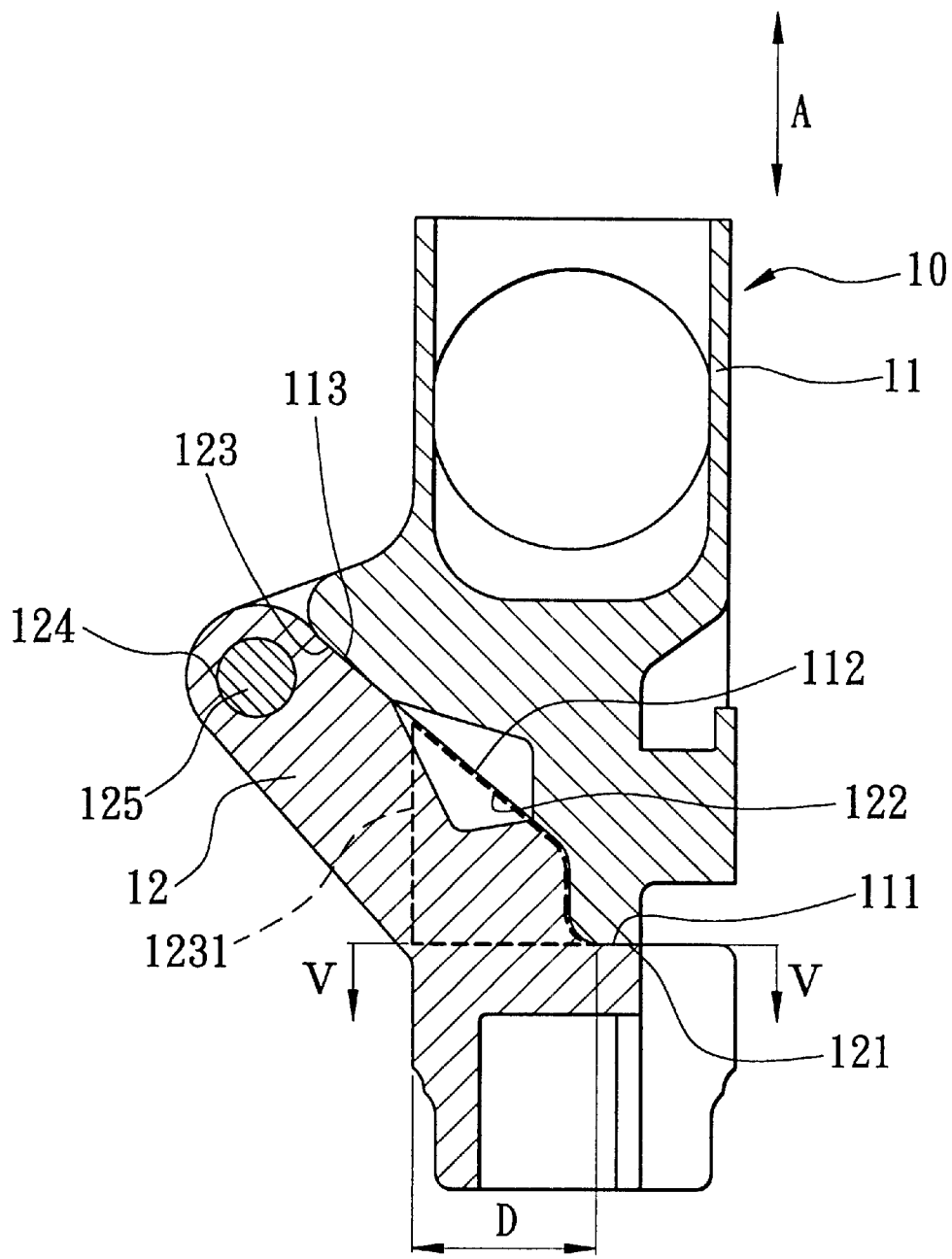
FIG. 4 is a sectional view of the preferred embodiment taken along line IV—IV in FIG. 2.

Referring to FIGS. 2, 3, and 4, the preferred embodiment of a foldable bicycle frame according to the present invention is shown to include a first frame half 11 with a connecting end portion 110, a second frame half 12 with a connecting end portion 120, a vertical pivot member 125, and a locking device (not shown).

As illustrated, the first and second frame halves 11,12 are arranged one behind another in a longitudinal direction (A) of the bicycle (see FIG. 4). The pivot member 125 interconnects the connecting end portions 110,120 of the first and second frame halves 11,12 to permit rotation of the first and second frame halves 11,12 relative to each other to a folded position (not shown). The locking device (not shown) locks the first and second frame halves 11,12 on each other, thereby preventing relative rotation between the first and second frame halves 11,12. A known locking device, such as a quick-release lock, can be used in the preferred embodiment so as to lock the first and second frame halves 11,12 together. Since the feature of the present invention does not reside in the construction of the locking device, a description thereof will be omitted herein for the sake of brevity.

The connecting end portion 110 of the first frame half 11 has a vertical end surface 111 that is perpendicular to the longitudinal direction of the bicycle, an integral upper lateral projection (110U), and an integral lower lateral projection (110L) that is located under the upper lateral projection (110U) to define a recess 112 therebetween. The upper lateral projection (110U) has a horizontal bottom surface 113B. The lower lateral projection (110L) has a horizontal top surface 113T.

The connecting end portion 120 of the second frame half 12 has a vertical end surface 121 which is perpendicular to the longitudinal direction (A) of the bicycle (see FIG. 4) and which abuts against the vertical end surface 111 of the first frame half 11 so as to prevent relative movement between the first and second frame halves 11,12 in the longitudinal direction (A). The vertical end surface 121 of the second frame half 12 is formed with an integral tongue 122 which engages the recess 112 in the first frame half 11, and which has a horizontal top surface 123T that abuts against the bottom surface 113B of the upper lateral projection (110U) of the first frame half 11, and a horizontal bottom surface 123B that abuts against the top surface 113T of the lower lateral projection (110L) of the first frame half 11 so as to prevent relative vertical movement between the first and second frame halves 11,12.

In the preferred embodiment, each of the upper and lower lateral projections (110U,110L) of the first frame half 11 has a pivot hole 114. The tongue 122 of the second frame half 12 has a pivot hole 124 formed therethrough. The pivot member 125 extends through the pivot holes 114,124 in the upper lateral projection (110U), the lower lateral projection (110L), and the tongue (122).

In case the bicycle frame of the present invention vibrates in upward and downward directions due to riding on an uneven road surface, the connecting end portions 110, 120 of the first and second frame halves 11,12 are prevented from flexing along the longitudinal direction (A), since the interengaging area 1231 (shown in dotted lines in FIG. 4) between the lateral projections (110U,110L) and the tongue 122 is relatively large. The interengaging area 1231 has a width (D) slightly less than that of the first and second frame halves 11,12, thereby ensuring firm engagement between the connecting end portions 110,120 of the first and second frame halves 11,12 of the bicycle.

Figure 5:
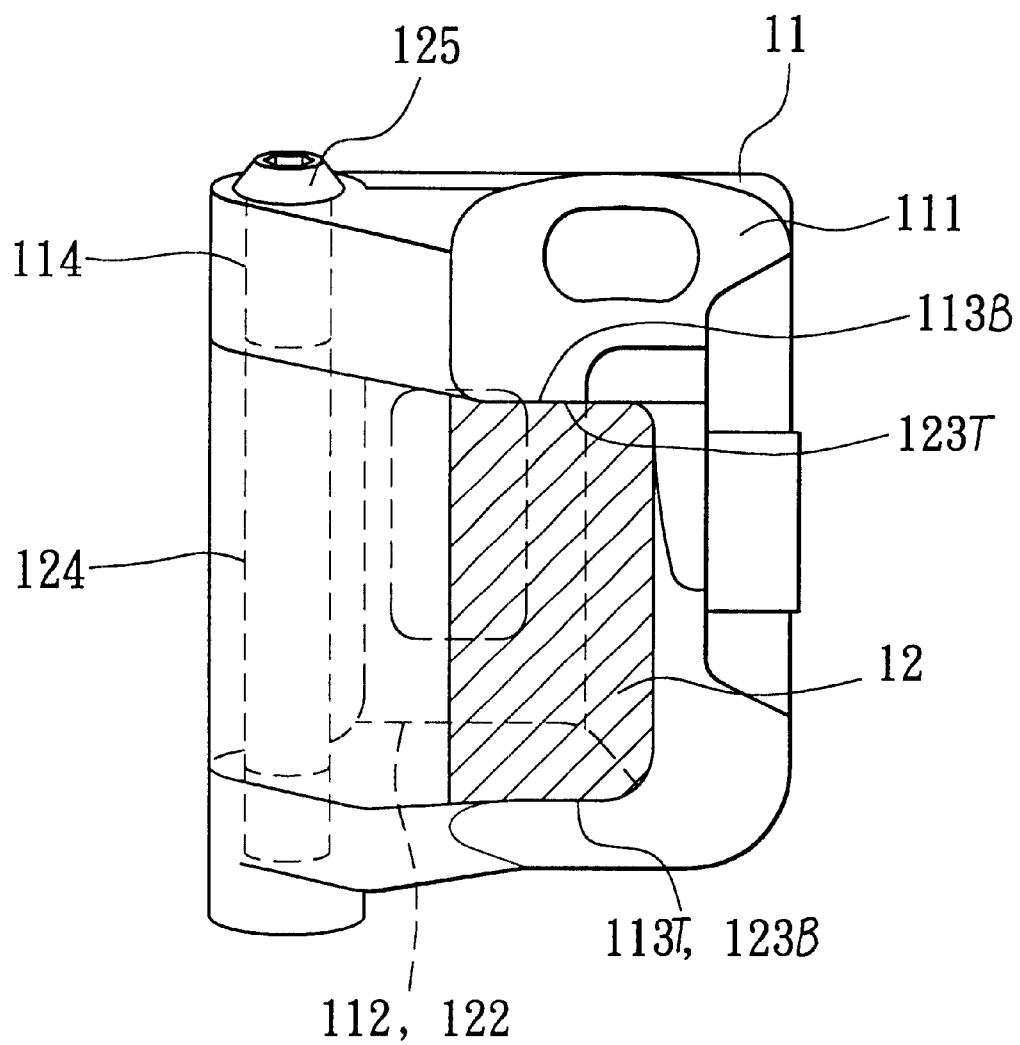
FIG. 5 is a fragmentary sectional view of the preferred embodiment taken along line V—V in FIG. 4.

FIG. 5 is a cross-sectional view of the preferred embodiment taken along line V—V in FIG. 4 to illustrate -the interengaging area between the lateral projections (110U, 110L) and the tongue 122.

With this invention thus explained, it is apparent that numerous modifications and variations can be made without departing from the scope and spirit of this invention. It is therefore intended that this invention be limited only as indicated by the appended claims.

I claim:

1. A foldable frame assembly for a bicycle, including:

a first frame half with a connecting end portion, a second frame half with a connecting end portion, the first and second frame halves being arranged one behind another, a vertical pivot member interconnecting pivotally the connecting end portions of the first and second frame halves to permit rotation of the first and second frame halves relative to each other in a folded position; and a locking device for locking the first and second frame halves on each other, thereby preventing relative rotation between the first and second frame halves, the improvement comprising:

the connecting end portion of the first frame half having a vertical end surface that is perpendicular to a longitudinal direction of the bicycle, an integral upper lateral projection, and an integral lower lateral projection that is located under said upper lateral projection to define a recess therebetween, said upper lateral projection having a horizontal bottom surface, said lower lateral projection having a horizontal top surface, wherein each of said upper and lower lateral projections of the first frame half has a pivot hole, the connecting end portion of the second frame half having a vertical end surface which is perpendicular to the longitudinal direction of the bicycle and which abuts against said vertical end surface of the first frame half so as to prevent relative movement between the first and second frame halves in the longitudinal direction, said vertical end surface of the second frame halfbeing formed with an integral tongue, said tongue of the second frame half has a pivot hole formed therethrough, said tongue engages said recess in the first frame half, and which has a horizontal top surface that abuts against said bottom surface of said upper lateral projection of the first frame half, and a horizontal bottom surface that abuts against said top surface of said lower lateral projection of the first frame half so as to prevent relative vertical movement between the first and second frame halves, and the vertical pivot member extending through said pivot holes in said upper lateral projection, said lower lateral projection, and said tongue to permit rotation of the first and second frame halves relative to each other in a folded position.

\* \* \* \* \*